US010123158B2

(12) United States Patent
Liao et al.

(10) Patent No.: US 10,123,158 B2
(45) Date of Patent: Nov. 6, 2018

(54) METHOD AND DEVICE FOR RECOGNIZING USER OF MOBILE DEVICE

(71) Applicants: Ke Liao, Beijing (CN); Bin Da, Beijing (CN); Wei Wang, Beijing (CN); Haihua Yu, Beijing (CN); Xin Wang, Beijing (CN)

(72) Inventors: Ke Liao, Beijing (CN); Bin Da, Beijing (CN); Wei Wang, Beijing (CN); Haihua Yu, Beijing (CN); Xin Wang, Beijing (CN)

(73) Assignee: Ricoh Company, Ltd., Tokyo (JP)

(*) Notice: Subject to any disclaimer, the term of this patent is extended or adjusted under 35 U.S.C. 154(b) by 64 days.

(21) Appl. No.: 15/012,214

(22) Filed: Feb. 1, 2016

(65) Prior Publication Data

US 2016/0232677 A1 Aug. 11, 2016

(30) Foreign Application Priority Data

Feb. 9, 2015 (CN) .......................... 2015 1 0064943

(51) Int. Cl.
*G06T 7/00* (2017.01)
*H04B 1/3827* (2015.01)
(Continued)

(52) U.S. Cl.
CPC .......... *H04W 4/02* (2013.01); *G06K 9/00362* (2013.01); *G06T 7/70* (2017.01);
(Continued)

(58) Field of Classification Search
None
See application file for complete search history.

(56) References Cited

U.S. PATENT DOCUMENTS 8,634,849 B2 * 1/2014 Jovicic ................. G01S 5/0009
455/456.1
2007/0183669 A1 * 8/2007 Owechko ........... G06K 9/00369
382/224

(Continued)

FOREIGN PATENT DOCUMENTS

| JP | 2003-099350 A | 4/2003 |
| JP | 2006-127240 A | 5/2006 |
| WO | WO-2009/113265 A1 | 9/2009 |

OTHER PUBLICATIONS

Japanese Office Action dated Nov. 22, 2016 issued in corresponding Japanese Application No. JP2016-021088.

(Continued)

*Primary Examiner* — Frederick D Bailey
(74) *Attorney, Agent, or Firm* — Harness, Dickey & Pierce, P.L.C.

(57) ABSTRACT

Disclosed is a method of recognizing a user of at least one mobile device by using an imaging device. The method comprises a first obtainment step of obtaining first positional information of the user of the at least one mobile device by using the imaging device; a second obtainment step of obtaining both second positional information and ID information of the at least one mobile device; a comparison step of comparing the first and second positional information so as to obtain a comparison result; and a determination step of determining, based on the comparison result, whether or not to let the ID information of the at least one mobile device be associated with the user of the at least one mobile device.

11 Claims, 10 Drawing Sheets

(51) Int. Cl.
    *G06K 9/00*           (2006.01)
    *H04W 4/02*         (2018.01)
    *G06T 7/70*          (2017.01)
    *H04W 4/80*         (2018.01)
    *H04W 4/00*         (2018.01)

(52) U.S. Cl.
    CPC .............. *G06T 2207/10012* (2013.01); *G06T 2207/30196* (2013.01); *H04W 4/008* (2013.01); *H04W 4/80* (2018.02)

(56) References Cited

U.S. PATENT DOCUMENTS

2010/0248745 A1* 9/2010 Ozawa .................. G01C 21/20
                                          455/456.3

2012/0027290 A1* 2/2012 Baheti .................. G06K 9/6857
                                          382/154
2013/0038490 A1* 2/2013 Garcia .................... G01S 13/74
                                          342/451
2014/0036087 A1* 2/2014 Furue .................. G11B 27/034
                                          348/157
2014/0186048 A1* 7/2014 Oshima ................ H04B 10/541
                                          398/118
2015/0043784 A1* 2/2015 Flint ...................... G01C 21/16
                                          382/106

OTHER PUBLICATIONS

"Doppler effect" [online], Wikipedia, the free encyclopedia, [Searched Jan. 21, 2016], the Internet URL: https://en.wikipedia.org/wiki/Doppler_effect.

* cited by examiner $$\left| d_{ncam} - d_{mTOF} \right|_{min}$$

$$|\alpha_{ncam} - \alpha_{msp}|_{min}$$

LOCALIZATION ERROR RANGE

METHOD AND DEVICE FOR RECOGNIZING USER OF MOBILE DEVICE

BACKGROUND OF THE INVENTION

1. Field of the Invention

The present invention relates to the field of wireless communications, and particularly relates to a method and device for recognizing the user of at least one mobile device.

2. Description of the Related Art

Object localization and tracking technologies have been widely utilized in many fields. For example, a well-used one is a method based on a stereo camera (also called a "3D camera"), in which by using a stereo vision based recognition method to conduct detection, localization, and tracking with respect to a human being, it is possible to localize him/her, and then to recognize his/her identity. In many conventional localization systems, a stereo vision based method may achieve the purpose of accurate localization. As such, a localization process conducted by an imaging device has been widely applied in an indoor localization scenario in which it is necessary to carry out detection, tracking, and localization.

However, in most applications, especially in a monitoring system, it is not only necessary to realize the purpose of determining "where a human being is" but also necessary to know "who is there". At present, it is possible to determine the position of a human being by adopting a localizing method conducted by an imaging device, and to realize human being recognition according to visual features such as surfaces and colors. On the basis of this, it is not necessary to install an additional device on the human being. Furthermore, the recognition process based on biometric information is reliable, and may uniquely determine the existence of the human being. However, the accuracy of the stereo vision based method may easily receive the influence of environmental factors such as lighting and image quality. Moreover, the relevant feature extraction and processing algorithms dominate the efficiency of this kind of recognition method. In general, the higher the recognition accuracy is, the more processing works the relevant camera needs to bear.

Another well-used recognition method is conducting ID recognition with respect to a human being, whose position has been determined, by utilizing a stereo vision recognition system and an additional auxiliary system. A common auxiliary system is a wireless or electronic system. The stereo vision recognition system and the auxiliary system may simultaneously determine the existence of the human being, and on the basis of the two determination results, it is possible to assign an ID to the human being. A typical one of the wireless or electronic systems is a RFID (Radio Frequency Identifier) system, and the ID in this case is the ID of the relevant RFID tag. In this kind of recognition method, the accuracy of binding and tracking is decided on the basis of the RFID tag distribution. In general, an accurate localization result needs a lot of RFID tags. However, although this kind of recognition method may recognize the identity of the human being, it is necessary to additionally deploy the wireless or electronic system. As such, the complexity and cost of the relevant system increase.

SUMMARY OF THE INVENTION

In light of the above-described problems, it is desired to provide a method and device capable of accurately conducting localization and recognition with respect to an object, without using any additional auxiliary device.

Considering the above-described problems and that a human being may normally carry his/her own mobile device, the inventors of the present invention propose a method and device for recognizing the user of at least one mobile device.

According to a first aspect of the present invention, a method of recognizing a user of at least one mobile device by using an imaging device is provided which may include:

a first obtainment step of obtaining first positional information of the user of each mobile device by using the imaging device;

a second obtainment step of obtaining both second positional information and ID information of each mobile device;

a comparison step of comparing, regarding each mobile device, the first and second positional information so as to acquire a comparison result related to the corresponding mobile device; and a determination step of determining, regarding each mobile device, whether or not to let the ID information of the corresponding mobile device be associated with the user of the corresponding mobile device, based on the comparison result related to the corresponding mobile device.

In addition, according to a second aspect of the present invention, a device for recognizing a user of at least one mobile device by using an imaging device is provided which may include:

a first obtainment part configured to obtain first positional information of the user of each mobile device by using the imaging device;

a second obtainment part configured to obtain both second positional information and ID information of each mobile device;

a comparison part configured to compare, regarding each mobile device, the first and second positional information so as to acquire a comparison result related to the corresponding mobile device; and a determination part configured to determine, regarding each mobile device, whether or not to let the ID information of the corresponding mobile device be associated with the user of the corresponding mobile device, based on the comparison result related to the corresponding mobile device.

As a result, by utilizing the method and device, it is possible to let, on the basis of positional information comparison, a user whose position has been determined be associated with corresponding recognition information (e.g., the ID information of a mobile device that the user carries), so as to easily recognize the user. In this way, it is possible to solve the above-described problems. Aside from this, since only an existing imaging device and a mobile device that a user may normally carry are adopted in the method and device, it is not necessary to utilize any additional auxiliary device. In this way, it is not only possible to reduce the relevant cost but also possible to easily achieve the method and device.

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
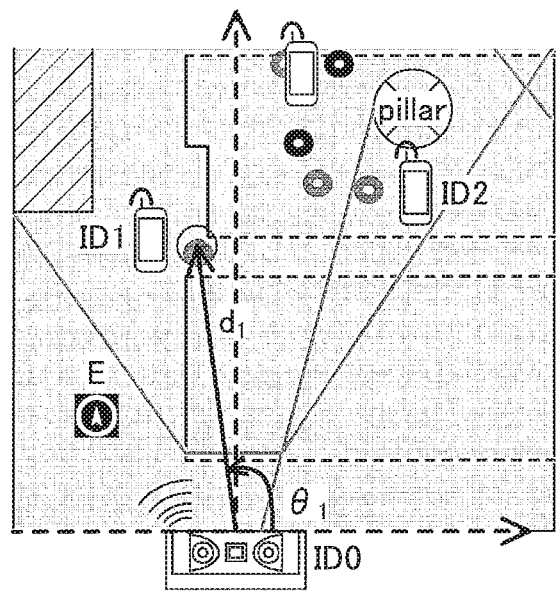
FIG. 1 illustrates an application scenario in which the present invention may be applied.

First, an application scenario in which the present invention may be applied is described by referring to FIG. 1.

FIG. 1 illustrates an application scenario 1000 in which the present invention may be applied.

As shown in FIG. 1, in a wireless network where an imaging device having ID information ID0 is located, there are plural users carrying their own mobile devices (also called "nodes"). In this drawing, the mobile devices are indicated by their own ID information ID0 to ID2, respectively. In the present invention, it is desired to recognize the user of each mobile device by utilizing the imaging device, i.e., to let the user be associated with the ID information which is carried by the corresponding mobile device, so that it is possible to conduct localization, recognition, tracking, etc., with respect to each user appearing in the wireless network.

Of course, what FIG. 1 shows is just for illustration; that is, the present invention is not limited in the scenario 1000 shown in this drawing. For example, although only one imaging device ID0 is included in FIG. 1, as will be depicted below, there may exist plural image devices therein. Moreover, although FIG. 1 shows only three users (each user carries a mobile device), the number of users may also be one, two, four, or more. Furthermore, the present invention may also be applied in any other scenario in which it is necessary to conduct user recognition by using an imaging device(s).

Figure 2:
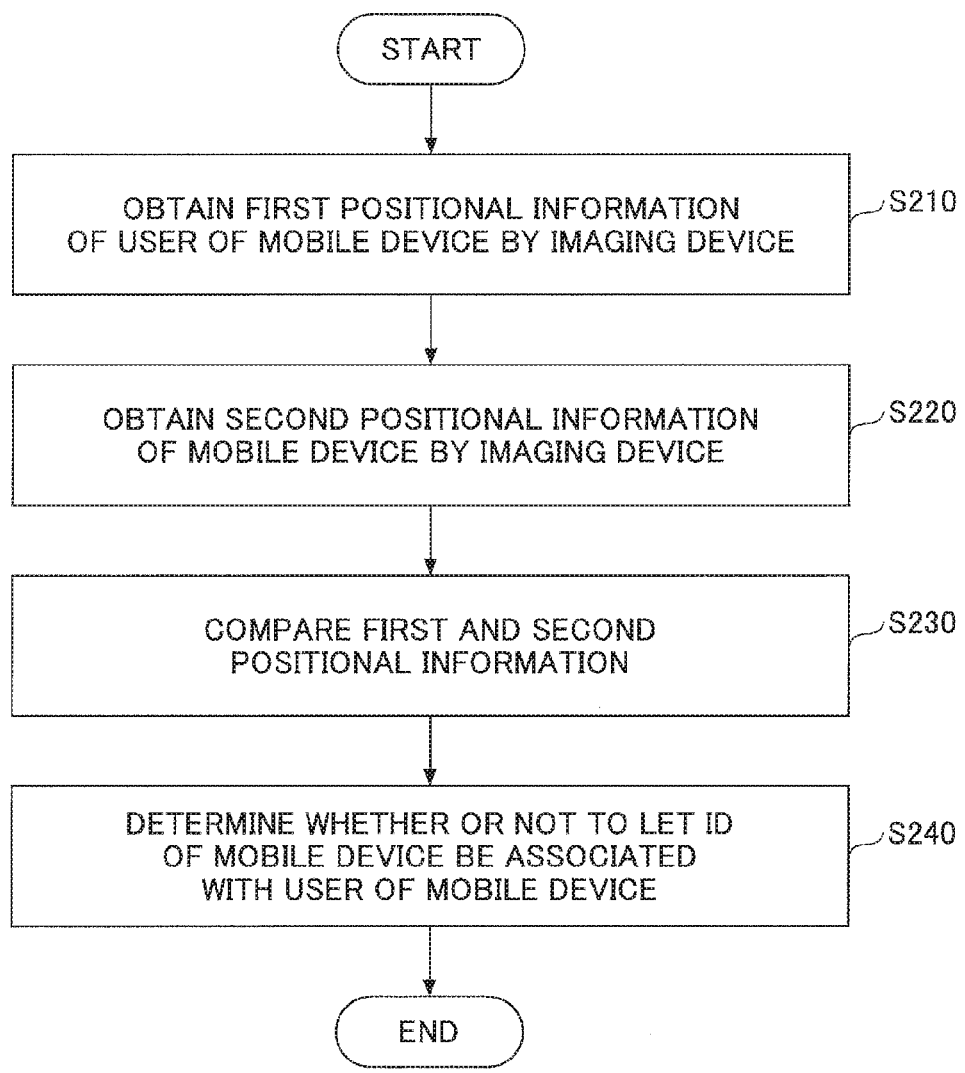
FIG. 2 is a flowchart of a recognition method of recognizing the user of at least one mobile device by using an imaging device, according to an embodiment of the present invention.

FIG. 2 is a flowchart of a recognition method of recognizing the user of at least one mobile device by using an imaging device, according to an embodiment of the present invention.

As shown in FIG. 2, the method includes STEPS S210 to S240. In STEP S210, the imaging device obtains first positional information of the user of the at least one mobile device. In STEP S220, the imaging device acquires both second positional information and ID information of the at least one mobile device. In STEP S230, the first and second positional information are compared so as to get a comparison result. In STEP S240, on the basis of the comparison result, it is determined whether or not to let the ID information of the at least one mobile device be associated with the user of the at least one mobile device.

Here it should be noted that the order of conducting STEPS S210 and S220 is not restricted in this embodiment. That is, STEP S210 may be conducted before or after STEP S220, or the two are conducted at the same time.

As described above, the imaging device may localize a human being on the basis of visual information. Since it is possible to obtain the three dimensional coordinates of the human being from a disparity map obtained by the imaging device, it is possible to determine the distance between the human being and the imaging device, the relative orientation angle (also called an "orientation angle") between the human being and the imaging device, etc. As such, in this embodiment, the imaging device may be a two-lens camera, for example.

In STEP S210 of FIG. 2, it is possible to use the disparity information of the user of the at least one mobile device acquired by the imaging device so as to obtain the positional information (i.e., the first positional information) of the user. As an example, the first positional information may be a distance.

For instance, it is possible to utilize the two-lens camera to capture two images of a target scene where a mobile device is located, so as to generate a disparity map. After that, it is possible to acquire the disparity information of the user of the mobile device from the disparity map, so that it is possible to get the distance (hereinafter, also called a "first distance") $d_{ncam}$ between the user and the two-lens camera on the basis of the disparity information.

Of course, this kind of distance calculation approach is just for illustration; that is, the present invention is not limited to this. It is also possible to adopt any other proper approach to obtain the first distance.

In STEP S220, the imaging device may acquire both the second positional information and the ID information of the at least one mobile device. Here it should be noted that in a case where the first positional information refers to a distance, the second positional information also refers to a distance.

Figure 3:
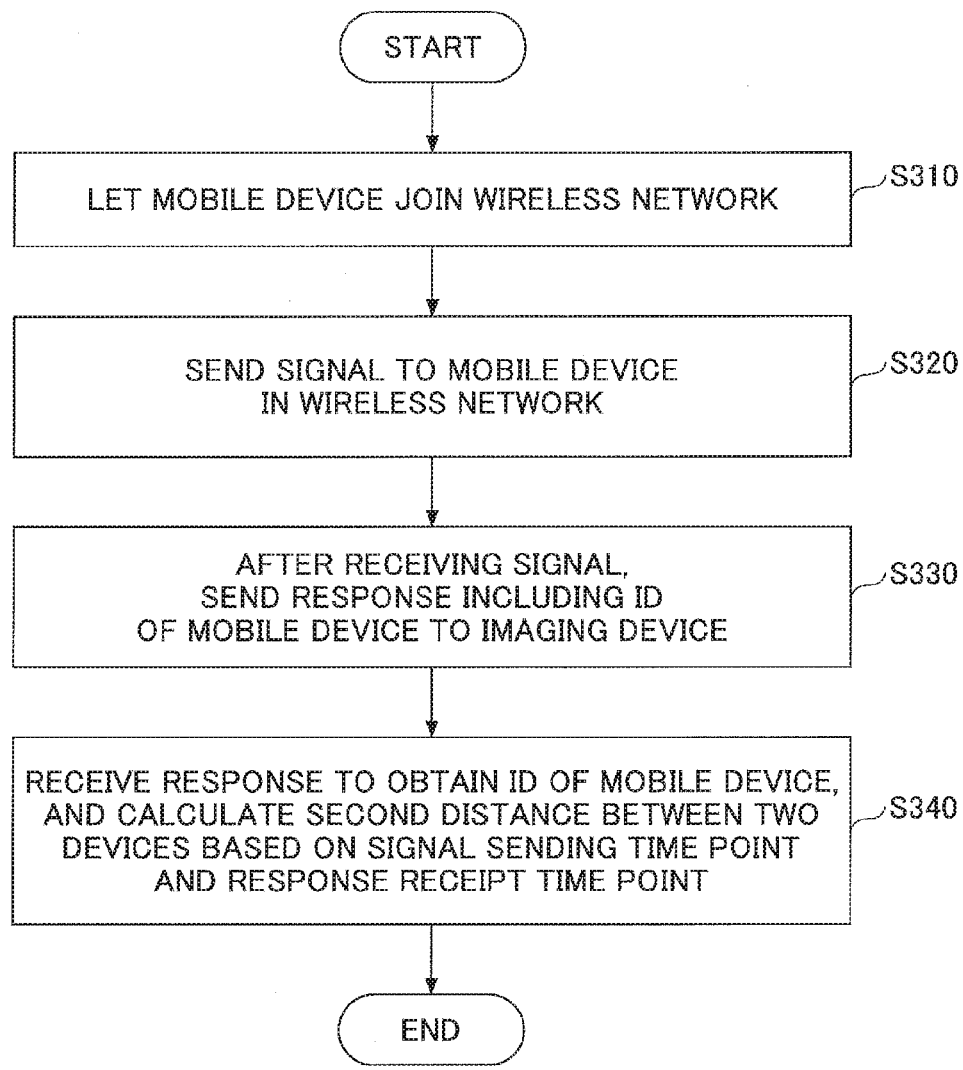
FIG. 3 is a flowchart of a process of obtaining both second positional information and ID information of a mobile device.

In what follows, an example of obtaining both the second positional information and the ID information of a mobile device by the imaging device will be depicted by referring to FIG. 3.

FIG. 3 is a flowchart of a process of obtaining both second positional information and ID information of a mobile device.

As shown in FIG. 3, the process includes STEPS S310 to S340. In STEP S310, the mobile device joins the wireless network where the imaging device is located. In STEP S320, the imaging device sends a signal to the mobile device in the wireless network. In STEP S330, after receiving the signal, the mobile device sends a response signal including its own ID information to the imaging device. In STEP S340, the imaging device receives the response signal so as to get the ID information of the mobile device, and on the basis of both the time point of sending the signal and the time point of receiving the response signal, calculates the distance (hereinafter, also called a "second distance") between the imaging device and the mobile device.

In STEP S310 of FIG. 3, after the mobile device enters the area of the wireless network, it joins the wireless network. For example, the imaging device may establish the wireless network, and the mobile device may search for and join the wireless network. The structure of the wireless network may be a star topology based one consisting of master and slave nodes. The imaging device may be the master node, and the mobile device may be one of the slave nodes. Additionally it is possible to adopt a Wi-Fi, Bluetooth, or BLE (Bluetooth Low Energy) based wireless network.

In STEP S320 of FIG. 3, the imaging device sends a signal to the mobile device in the wireless network, and records the time point $T_{as}$ of sending the signal. The signal sent may be an omnidirectional low-frequency one because it is possible to easily conduct distance calculation on the basis of the velocity of a sound (audio) signal. In order to let the mobile device easily recognize the imaging device, the sound signal sent may include the ID information (e.g., ID0) of the imaging device, which has been encoded based on frequencies. Additionally in order to reduce the interference due to the environmental noise and the Doppler effect, a frequency change based encoding approach may be adopted for encoding the ID information of the imaging device.

In STEP S330 of FIG. 2, the at least one mobile device receives the sound signal sent by the imaging device, then on the basis of the frequencies of the received sound signal, conducts decoding with respect to the received sound signal so as to acquire the ID information of the imaging device, and then sends a response signal to the imaging device. The response signal may include both the ID information of the imaging device which is obtained from the sound signal and the ID information of the at least one mobile device itself, and these two kinds of ID information are also encoded. The response signal may also be a sound signal, or may be a radio signal. In order to reduce the noise influence and improve the data exchange rate, desirably the response signal is the radio signal. A possible radio signal may include a BLE or Wi-Fi signal.

As an example, the ID information of the at least one mobile device may be its MAC address. Of course, the present invention is not limited to this; that is, any other proper information may serve as the ID information of the at least one mobile device.

In STEP S340 of FIG. 3, the imaging device receives the response signal sent by the at least one mobile device, and conducts decoding with respect to the response signal so as to acquire both the ID information of the imaging device and the ID information of the at least one mobile device therein. After that, the imaging device may compare its own ID information and the ID information of the imaging device acquired from the response signal, so as to determine that the response signal it receives is a reply to the signal it sent by the at least one mobile device. In this way, it is possible to avoid the noise influence.

In addition, in STEP S340 of FIG. 3, the imaging device records the time point $T_{ar}$ of receiving the response signal, and then on the basis of TOD (Time Of Flight) of the response signal, calculates the distance (i.e., the second distance) $d_{mTOF}$ to serve as the second positional information.

In particular, the time delay $T_{count}$ of one relative positioning process in the wireless network may be expressed by the following equation (1).

$$T_{count} = t_{as} - t_{ar} = T_{sp} + T_{sr} + T_{wswr} \quad (1)$$

Here, $T_{sp}$ refers to the time delay of the sound signal propagating from the imaging device to a mobile device; $T_{sr}$ refers to the time delay of receiving and processing the sound signal at the mobile device; and $T_{wswr}$ refers to the time delay of the packaging, sending, and receipt of the radio signal. The time delay $T_{count}$ of one relative positioning process in the wireless network is equal to the time difference between the above time points $T_{as}$ and $T_{ar}$ recorded by the imaging device, and is approximately equal to ($T_{sp}+T_{sr}+T_{wswr}$). Here it should be noted that since the propagation velocity of the radio signal is much greater than that of the sound signal, the propagation based time delay of the radio signal may be ignored. As such, in order to obtain $T_{sp}$, it is only necessary to know $T_{sr}$ and $T_{wswr}$.

In addition, regarding the time delay $T_{wswr}$ of the radio signal, since the wireless protocol upper layer related time delay depends on the wireless network situation, and is difficult to estimate, while because the time delay of a signal from the physical layer is very small, and may be ignored, it is preferred to adopt a physical layer related signal to avoid the relevant time delay based influence. In this way, it is possible to improve the distance measurement accuracy.

In addition, as for the time delay $T_{sr}$ generated when the mobile device receives and processes the sound signal, it may be obtained on the basis of both the pulse frequencies for conducting ID information encoding when the imaging device sends the sound signal and the number of the pulses that the imaging device sends. In general, $T_{sr}$ may be expressed by the following equation (2).

$$T_{sr} = 2 \times T_{pulse} \times N_{pulse} \times N_{ID} \quad (2)$$

Here, $T_{pulse}$ stands for the time length of one pulse. Since when sending the sound signal, its sending frequency has been known, $T_{pulse}=1/f$. Additionally, $N_{pulse}$ stands for the number of pulses necessary to be sent with respect to each bit of the ID information needing to be sent, and $N_{ID}$ stands for the number of bits of the ID information.

When conducting ID information encoding, in general, it is possible to use the change from a frequency $f_1$ to another frequency $f_2$ to represent bit 0, and to use the change from $f_2$ to $f_1$ to represent bit 1. That is, it is necessary to utilize two pulse frequencies to send one bit of data. This is also the reason why in the above equation (2), it is necessary to be multiplied by 2. Here the frequency f ($T_{pulse}=1/f$) in the above equation (2) may take the average value of the two sending frequencies $f_1$ and $f_2$, i.e., $f=(f_1+f_2)/2$. The frequency band able to conduct ID information encoding is on the basis of the frequency band of a microphone and a speaker mounted in most mobile devices, and may be from 20 Hz to 20 KHz. Since a sound signal with a low frequency has a characteristic that makes it easy to bypass an obstacle, it is preferred to use a low-frequency sound signal in the encoding process.

Here an instance is given in which the changes between two frequencies 20 Hz and 30 Hz are used to represent bits 0 and 1, respectively. In particular, the change from 30 Hz to 20 Hz represents bit 0, and the change from 20 Hz to 30 Hz represents bit 1. Additionally it is assumed that the ID information of the imaging device is "001". Here, in order to achieve redundant encoding so as to reduce the bit error rate, the ID information is sent four times repeatedly, i.e., it is possible to conduct encoding with respect to ID information "0000,0000,1111" by using a sound signal including the changes of the frequencies. In this case, according to the above equation (2), the time delay $T_{sr}$ occurring when the mobile device carries out decoding and processing after it receives the sound signal is $T_{sr}=2\times[2/(30+20)]\times4\times3=0.96$ seconds.

Thus, according the above equation (1), it is possible to acquire the value of $T_{sp}$ on the basis of the values of $T_{count}$ and $T_{sr}$, i.e., the one-way propagation time of the sound signal from the imaging device to the mobile device, so that it is possible to calculate the second distance between the mobile device and the imaging device on the basis of the propagation velocity of the sound signal.

As such, in STEP S220 of FIG. 2, the imaging device may obtain both the second positional information and the ID information of the at least one mobile device by utilizing the process shown in FIG. 3.

Refer again to FIG. 2; in STEP S230, the first positional information obtained in STEP S210 and the second positional information obtained in STEP S220 are compared. For example, it is possible to compare the first distance between the imaging device and the at least one mobile device and the second distance between the imaging device and the at least one mobile device.

Here it should be noted that since the imaging device captures and processes images according to a predetermine number of frames, and because the imaging device also broadcasts a signal every predetermined time period so as to obtain a response from the at least one mobile device in the wireless network, it is necessary to ensure that the time delays when the imaging device obtains the first and second positional information are within a same time period. That is, the two kinds of localization systems for obtaining the two kinds of positional information should have basically the same localization speed, so that it is possible to compare the first and second positional information obtained in basically the same time period (i.e., a predetermined time interval). In this way, it is possible to accurately carry out localization comparison with respect to the two kinds of localization systems.

Figure 4:
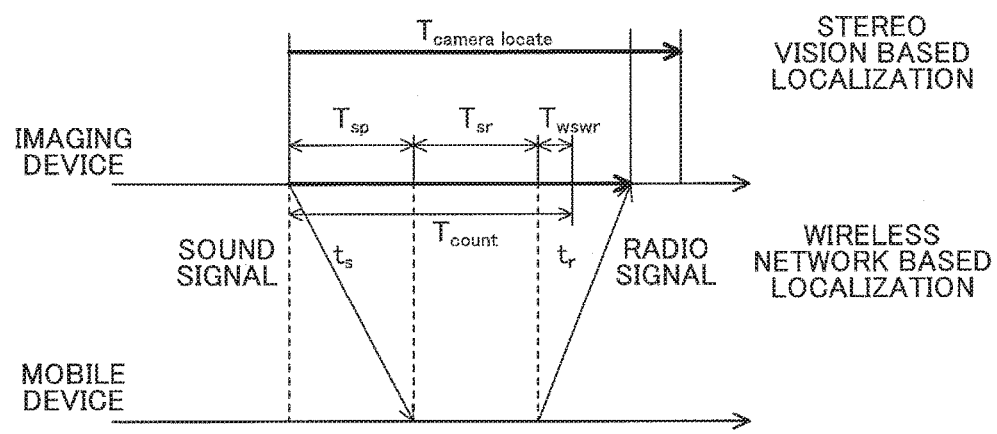
FIG. 4 illustrates two time delays when an imaging device conducts stereo vision based localization and wireless network based localization.

FIG. 4 illustrates two time delays when the imaging device carries out one stereo vision based localization process and one wireless network based localization process, respectively.

As shown in FIG. 4, the time delay $T_{camera\_locate}$ when the imaging device conducts stereo vision based localization once and the time delay $T_{count}$ when the imaging device conducts a relative positioning process once in the wireless network should satisfy the relationship expressed by the following equation (3).

$$T_{count} \le T_{camera\_locate} \quad (3)$$

As described above, the time delay $T_{count}$ when the imaging device conducts the relative positioning process once in the wireless network may be acquired according to the above equation (1). And the time delay $T_{camera\_locate}$ when the imaging device conducts stereo vision based localization once depends on the frame rate and the processing speed of the imaging device itself and the complexity of the stereo vision based localization algorithm adopted. Here, regarding the imaging device, usually its processing speed and the complexity of the stereo vision based localization algorithm adopted are fixed. As such, in order to satisfy the condition expressed by the above equation (3), it is usually possible to adjust the frame rate of the imaging device so as to realize this kind of purpose.

Refer again to FIG. 2; in STEP S240, it is possible to determine, on the basis of the comparison result obtained in STEP S230, whether or not to let the ID information of the at least one mobile device be associated with the user of the at least one mobile device.

In an ideal case, since a mobile device is carried by a user, the distance between the imaging device and the user of the mobile device, which is determined by the imaging device according to stereo vision based localization and the distance between the imaging device and the mobile device, which is determined by the imaging device according to wireless network based localization should be equal to each other. As such, by comparing, by the imaging device, the first and second positional information, for example, by determine whether the first distance is equal to the second distance, it is possible to determine whether the two kinds of positional information are with respect to the same mobile device, so that it is possible to decide whether or not to let the user of the at least one mobile device to be associated with the ID information of the at least one mobile device so as to recognize the user.

However, in an actual case, since there exists a localization error, the distances with respect to a same mobile device obtained by the two kinds of localization systems may be different. As such, it is possible to adopt the minimum value of the differences between the first distances $d_{ncam}$ and the second distances $d_{mTOF}$ to recognize the user of the at least one mobile device (here, $d_{ncam}$ denotes the distance between an n-th user and the imaging device, and $d_{mTOF}$ denotes the distance between a m-th mobile device and the imaging device), as shown by the following equation (4).

$$|d_{ncam}-d_{mTOF}|min \quad (4)$$

That is, if the difference between one of the first distances ($d_{ncam}$) and one of the second distances ($d_{mTOF}$) is minimum, then that means the user corresponding to this first distance carries the mobile device corresponding to this second distance. As such, it is possible to let this user be associated with the ID information of this mobile device. In this way, it is possible to give a user, whose position has been determined by the imaging device on the basis of stereo vision, corresponding ID information.

Figure 5:
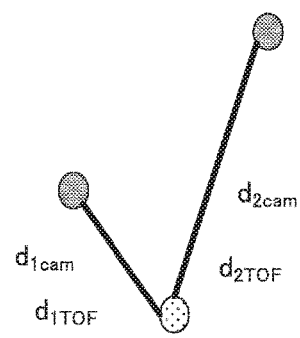
FIG. 5 illustrates an example of distance comparison.

FIG. 5 illustrates an example of distance comparison.

In FIG. 5, two black dots represent mobile devices (e.g., called "first and second mobile devices" from left to right), and one gray dot represents an imaging device. As shown in this drawing, the difference between the first distance $d_{1cam}$ from the imaging device to the user (also called a "first user") of the first mobile device and the second distance $d_{1TOF}$ from the imaging device to the first mobile device is minimum, and the difference between the first distance $d_{2cam}$ to the user (also called as a "second user") of the second mobile device and the second distance $d_{2TOF}$ to the second mobile device is minimum. As such, it is possible to let the ID information of the first mobile device be associated with the first user, and to let the ID information of the second mobile device be associated with the second user.

As a result, according to the recognition method shown in FIG. 2, it is possible to let, on the basis of the comparison result of two kinds of positional information, a user be associated with corresponding recognition information (e.g., the ID information of a mobile device that the user carries) so as to easily recognize the user. In this way, it is possible to solve the problem of "who is there" described in the background in the present invention. In addition, since the recognition method may be achieved by adopting only an existing imaging device and a mobile device that a user normally carries, it is not necessary to use any additional auxiliary device. In this way, it is not only possible to reduce the relevant cost but also possible for the method to be easily realized.

Here it should be noted that up to here, the recognition method shown in FIG. 2 has been described on the basis of an example in which a distance serves as the positional information. However, the positional information is not limited to this. That is, it is also possible to adopt an orientation angle to serve as the positional information.

In particular, refer again to FIG. 2; in STEP S210, it is possible to obtain the orientation angle $\alpha_{ncam}$ of the user of the at least one mobile device relative to the imaging device (hereinafter, called a "first orientation angle"). As described above, since in this step, it is possible to obtain the three dimensional coordinates of the user from the relevant disparity map obtained by the imaging device, it is possible to acquire the first orientation angle on the basis of the three dimensional coordinates.

In STEP S220 of FIG. 2, it is also possible to get the orientation angle $\alpha_{msp}$ of the at least one mobile device relative to the imaging device (hereinafter, called a "second orientation angle").

Generally a mobile device has an inertial sensor therein. The inertial sensor is a kind of sensor which can detect and measure an acceleration, a tilt, a shock, a vibration, a rotation, and a multi-degree-of-freedom motion. It may include, for instance, an accelerometer (or an acceleration transducer), an angular transducer (or a gyroscope), an inertial measurement unit (IMU) using a combination of the accelerometer and the gyroscope (sometimes also a magnetometer), and an attitude and heading reference system (AHRS) including a magnetic sensor. Hence the inertial data (also called "inertial sensor data") of the inertial sensor in the mobile device may include, for example, the acceleration (in a very short time period, it is possible to estimate the corresponding velocity on the basis of the acceleration), the angular velocity, the attitude and heading, and the orientation angle of the mobile device itself.

Moreover it is well-known that a sound signal may receive the Doppler effect. As such, it is possible to use the inertial data of the at least mobile device to calculate the second orientation angle of the at least one mobile device with respect to the imaging device according to the Doppler effect. Here it should be noted that for more information about the Doppler effect.

For example, in STEP S220 of FIG. 2, more particularly in STEP S310 of FIG. 3, when the mobile device joins the wireless network established by the imaging device, the imaging device may obtain the inertial data of the mobile device. In STEP S320 of FIG. 3, the imaging device may record the sending frequencies for sending the sound signal. In STEP S330 of FIG. 3, the mobile device may record the receipt frequencies of the sound signal that the imaging device sends, and may send the receipt frequencies as a part of a response signal to the imaging device.

After that, in STEP S340 of FIG. 3, when the imaging device conducts decoding with respect to the response signal, it may acquire the receipt frequencies of the sound signal when the mobile device receives the sound signal. In this way, on the basis of the sending frequencies and the receipt frequencies, the imaging device may calculate the second orientation angle from the inertial data on the basis of the Doppler effect.

Figure 6:
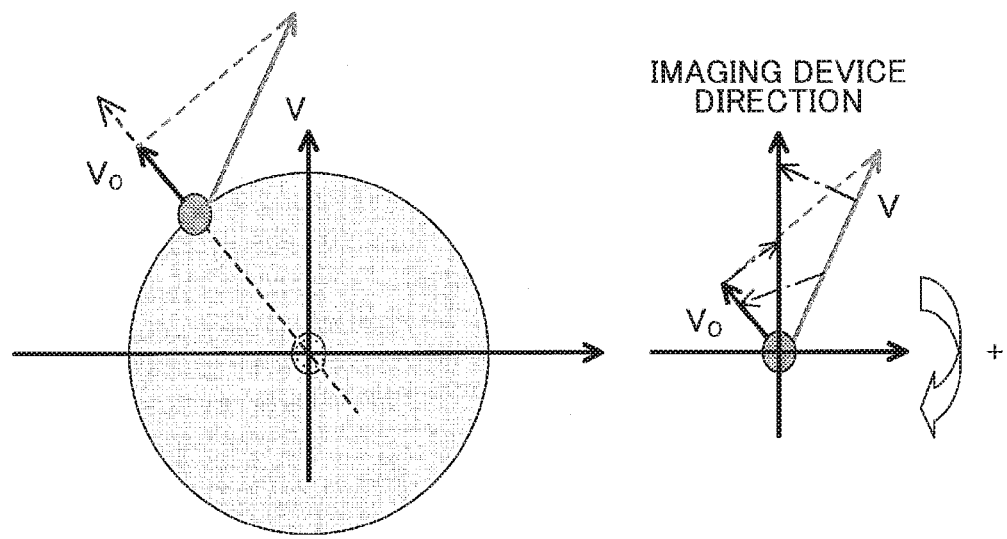
FIG. 6 illustrates how to calculate a second orientation angle.

FIG. 6 illustrates how to calculate a second orientation angle.

As shown in FIG. 6, since the imaging device is fixed, and because the mobile device moves, it is possible to let the device orientation of the imaging device be a reference direction, and then to calculate the second orientation angle of the mobile device with respect to the imaging device by utilizing the following equations (5) to (8).

$$\alpha = \theta_{v_0 \to cam} = \theta_{v \to cam} - \theta_{v \to v_0} \tag{5}$$

$$\theta_{v \to cam} = \theta_v - \theta_{cam} \tag{6}$$

$$\theta_{v \to v_0} = \cos^{-1} \frac{v}{v_0} \tag{7}$$

$$v_0 = v \times \left| 1 - \frac{f'}{f} \right| \tag{8}$$

Here, $\alpha$ refers to the second orientation angle between the imaging device and the mobile device whose position has been determined; v refers to the moving velocity of the mobile device, and may be acquired on the basis of the inertial data of the mobile device; $v_0$ refers to the relative velocity of the mobile device relative to the imaging device; $\theta_{v_0 \to cam}$ refers to the angle between the direction of $v_0$ and the reference direction of the imaging device; $\theta_{v \to cam}$ refers to the angle between the direction of v and the reference direction (which may be obtained on the basis of the difference between the orientation angle $\theta_v$ of the mobile device and the reference direction (i.e., the orientation angle $\theta_{cam}$ of the imaging device which is known in general); $\theta_{v \to v_0}$ refers to the angle between the direction of v and the direction of $v_0$; f' refers to the receipt frequency of the sound signal; and f refers to the sending frequency of the sound signal.

As is well known, on the basis of the receipt frequency f' and the sending frequency f of the sound signal, it is possible to estimate the Doppler effect. In particular, if the receipt frequency f' is greater than the sending frequency f, then that means the mobile device approaches the imaging device; at this time, the above equation (8) may be expressed as the following equation (8').

$$v_0 = v \times \left( \frac{f'}{f} - 1 \right) \tag{8'}$$

On the other hand, if the receipt frequency f' is less than the sending frequency f, then that means the mobile device departs from the imaging device; at this time, the above equation (8) may be expressed as the following equation (8").

$$v_0 = v \times \left( 1 - \frac{f'}{f} \right) \tag{8''}$$

Here, refer again to FIG. 2; in STEP S230, the first orientation angle of the user of the at least one mobile device and the second orientation angle of the at least one mobile device are compared. Of course, the above-described orientation calculation approach is just an example for illustration. That is, the present invention is not limited to this, and may adopt any other proper approach to calculate the orientation angles.

For example, the imaging device may obtain the coordinates of a mobile device by using a proper localization algorithm, and then, on the basis of the coordinates of the mobile device and the coordinates of the imaging device itself, may calculate the orientation angle of the mobile device relative to the imaging device. In particular, the orientation angle may be acquired by adopting the following equation (9).

$$\alpha = \theta + \tan^{-1}\frac{x_2 - x_1}{y_2 - y_1} \tag{9}$$

Here, $\alpha$ stands for the orientation angle of the mobile device relative to the imaging device; $\theta$ stands for the North Magnetic Pole based angle of the imaging device (i.e., an absolute angle); (x1, y1) stands for the coordinates of the imaging device; and (x2, y2) stands for the coordinates of the mobile device.

In addition, if the initial position $(x2_0, y2_0)$ of the mobile device is known, then on the basis of the inertial data of the mobile device obtained as described above, it is possible to estimate the current coordinates (x2, y2) of the mobile device. In order to obtain the initial position $(x2_0, y2_0)$ of the mobile device, it is necessary to carry out another localization process. It is possible to utilize any proper localization approach to realize the other localization process. For example, it is possible to achieve the other localization process by sending a radio signal between the imaging device and the mobile device. Here it should be noted that since the current coordinates of the mobile device have been acquired, and because the coordinates of the imaging device have been known, they may also be used for calculating the second distance between the mobile device and the imaging device.

However, the conventional localization processes are relatively complicated, and need to pre-deploy a beacon node(s) in general. In addition, as described above, when the radio signal is sent, the mobile device that receives the radio signal may be in a moving state. As such, there may exist the Doppler effect between the imaging device and the mobile device. The Doppler effect may result in the change of the propagation distance of the radio signal from the sending time point to the receipt time point, so that the receipt frequency of the radio signal may become incorrect.

On the contrary, the orientation angle calculation approach on the basis of the above equations (5) to (8) may get a more accurate calculation result, and does not need any beacon node. As such, it is preferred. Similarly since the process of calculating the second distance shown in FIG. 3 also does not need any beacon node, it is easily achieved, and may acquire a more accurate calculation result. As such, it is also preferred.

And then, in STEP S240 of FIG. 2, it is possible to determine, on the basis of the orientation angle comparison result, whether or not to let the ID information of the at least one mobile device be associated with the user of the at least one mobile device.

In an ideal case, a user carries one mobile device, and the first orientation angle of the user, whose position is determined based on stereo vision by the imaging device, relative to the imaging device should be equal to the second orientation angle of the mobile device, whose position is determined based on the Doppler effect by the imaging device, relative to the imaging device. As such, the imaging device may determine, by comparing the first and second orientation angles, whether the two are with respect to the same mobile device, so that it is possible to decide whether or not to let the user of the at least one mobile device be associated with the ID information of the at least one mobile device so as to recognize the user.

However, in an actual case, as described above, there may exist a positioning error. Regarding a same mobile device, the orientation angles obtained by the two kinds of positioning systems may be different. As such, it is possible to use the minimum value of the differences between the first orientation angles $\alpha_{ncam}$ and the second orientation angles $\alpha_{msp}$ to recognize the user of the at least one mobile device (here, $\alpha_{ncam}$ refers to the orientation angel between an n-th user and the imaging device, and $\alpha_{msp}$ refers to the orientation angle between an m-th mobile device and the imaging device), as shown by the following equation (10).

$$|\alpha_{ncam} - \alpha_{msp}|_{min} \tag{10}$$

That is, if the difference between one of the first orientation angles and one of the second orientation angles is minimum, then that means the user corresponding to this first orientation angle carries the mobile device corresponding to this second orientation angle. As such, it is possible to let this user be associated with the pre-obtained ID information of this mobile device. In this way, it is possible to assign corresponding recognition information to a user which is localized based on stereo vision by the imaging device.

Figure 7:
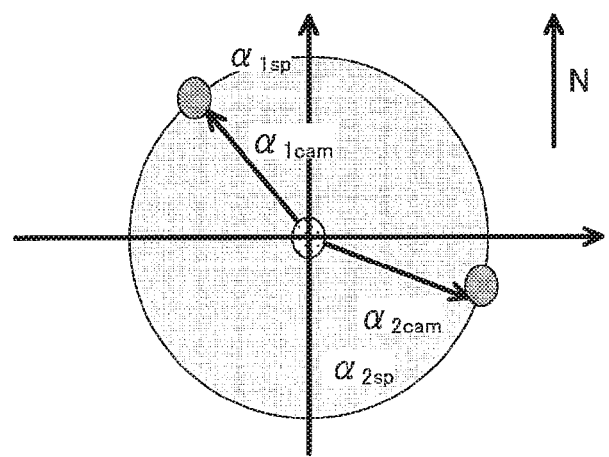
FIG. 7 illustrates an example of orientation angle comparison.

FIG. 7 illustrates an example of orientation angle comparison.

In FIG. 7, two black dots represent two mobile devices (e.g., called "first and second mobile devices" from left to right), and one gray dot represents one imaging device. As shown in FIG. 7, the difference between the first orientation angle $\alpha_{1scam}$ of the user (also called a "first user") of the first mobile device relative to the imaging device and the second orientation angle $\alpha_{1sp}$ of the first mobile device relative to the imaging device is minimum; also, the difference between the first orientation angle $\alpha_{2cam}$ and the second orientation angle $\alpha_{2sp}$ is minimum. As such, it is possible to let the ID information of the first mobile device be associated with the first user of the first mobile device, and let the ID information of the second mobile device be associated with the second user of the second mobile device.

Actually there may exist a case where the orientation angles of plural users relative to the imaging device are different, but their distances to the imaging device are the same. Of course, as described above, there may exist a localization error. Here the so-called "the same" means that the differences of the distances between the plural users and the imaging device are less than a predetermined value (called a "first predetermined value"), i.e., within a predetermined error range. As such, in this case, in the recognition method shown in FIG. 2, there may exist plural first distances among the obtained first distances between the imaging device and the at least one mobile devices (in this case, e.g., two or more mobile devices), the differences of the plural first distances being less than the first predetermined value. At this time, only by conducting distance based comparison, it is difficult to recognize, by the imaging device, the users of the plural mobile devices corresponding to the plural first distances which are the same. As such, in this case, regarding the users of the plural mobile devices corresponding to the plural first distances which are the same, it is possible to further carry out orientation angle based comparison as done above, so that it is possible to recognize these users.

On the other hand, perhaps there is a case where the distances between plural users and the imaging device are different, but their orientation angles relative to the imaging device are the same. Of course, similarly, there may exist a localization error. Here the so-called "the same" also means that the differences of the orientation angles between the plural users and the imaging device are less than a predetermined value (called a "second predetermined value"), i.e., within a predetermined error range. At this time, only by conducting orientation angle based comparison, it is difficult to recognize, by the imaging device, the plural users having the same relative orientation angle. As such, in this case, regarding the plural users having the same relative orientation angle, it is possible to further carry out distance based comparison as done above, so that it is possible to recognize these users.

That is, the recognition method on the basis of distance based comparison and the recognition method on the basis of orientation angle based comparison may be utilized independently or in combination, and the order of the two comparison processes is not restricted. For example, it is possible to first conduct the distance based comparison process, and then to conduct, if it is impossible to distinguish among the users of plural mobile devices on the basis of the distance based comparison result, the orientation angle based comparison process. Alternatively, it is possible to first carry out the orientation angle based comparison process, and then to carry out, if it is impossible to distinguish among the users of plural mobile devices on the basis of the orientation angle based comparison result, the distance based comparison process. Of course, up to here, the recognition method according to this embodiment has been illustrated on the basis of an example in which a distance and/or an orientation angle serve(s) as the positional information. However, the positional information is not limited to this; in other words, it is also possible to adopt any other information, by which it is possible to distinguish among the users of plural mobile devices, to serve as the positional information.

Moreover, in an example, in order to improve the positioning accuracy so as to more accurately conduct user recognition, it is also possible to carry out positional information correction on the basis of inertial data.

Particularly, it is possible to correct, on the basis of the inertial data of the at least one mobile device obtained in STEP S220 of FIG. 2, the obtained first distance and/or the first orientation angle, and then to determine, on the basis of the comparison result(s) of the corrected first distance and/or the corrected orientation angle and the second distance and/or the second orientation angle, whether or not to let the ID information of the at least mobile device be associated with the user of the at least mobile device.

For instance, the imaging device may set, on the basis of the accumulated error related to the inertial data of a mobile device and the stereo vision based localization error of the imaging device itself, a valid historical window, as shown by the following equation (11).

$$t_h \leq \varepsilon_{location}/\varepsilon_{inertial} \qquad (11)$$

Here, $t_h$ denotes the valid historical window, i.e., a time period in which the accumulated error $\varepsilon_{inertial}$ of the inertial data is less than the stereo vision based localization error $\varepsilon_{location}$.

By using this kind of valid historical window, the imaging device may correct the stereo vision based localization result on the basis of the inertial data of the mobile device. For example, the imaging device may obtain the historical moving information of the mobile device on the basis of the inertial data of the mobile device to acquire the historical positional information of the user of the mobile device in the valid historical window, so as to serve as corrected first positional information. After that, the imaging device may compare the corrected first positional information and the second positional information obtained by utilizing the wireless network based positioning process at the same time point, and then may let, on the basis of the comparison result, the ID information of the mobile device be associated with the user of the mobile device.

As an example, if it is assumed that when the positional information of two mobile devices at the current time point obtained in the recognition method shown in FIG. 2 is the same (i.e., the difference between the two is within a predetermined error range), and the valid historical window calculated according to the above equation (11) is less than or equal to 3 seconds, then it is possible to estimate, on the basis of the inertial data during 3 seconds before the current time point, the first positional information (the first distances and/or the first relative orientation angles) of the two mobile devices at the time point before 3 seconds from the current time point, so as to serve as the corrected first positional information. After that, it is possible to compare the corrected first positional information and the second positional information obtained at the time point before 3 seconds from the current time point by using the wireless network based positioning process.

Figure 8:
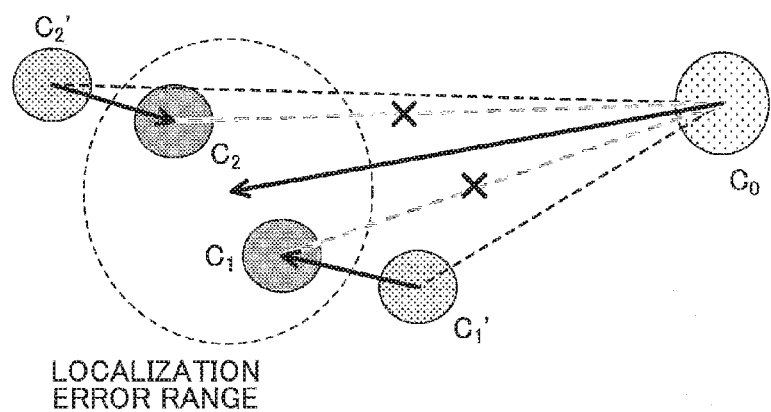
FIG. 8 illustrates how to improve localization accuracy on the basis of historical moving information.

FIG. 8 illustrates an example of how to improve the localization accuracy on the basis of the historical moving information.

As shown in FIG. 8, first and second mobile devices $C_1$ and $C_2$ are located in a predetermined localization error range of an imaging device $C_0$ (here it should be noted that regarding the localization error range, it will be set forth below). On the basis of the inertial data of the two mobile devices, it is possible to determine the historical positions $C_1'$ and $C_2'$ of the two mobile devices. After that, the imaging device $C_0$ may recognize the historical positions $C_1'$ and $C_2'$ so as to recognize the relevant users by conducting comparison on the basis of the two historical positions.

As a result, in an actual case, when plural users are close to each other so that their distances and orientation angles with respect to the imaging device are almost the same, respectively, i.e., they are located within a predetermined location error range of the imaging device, the imaging device may correct their first positional information on the basis of the relevant inertial data so as to improve the localization accuracy, so that it is possible to distinguish among the plural users located within the predetermined localization error range of the imaging device.

Moreover, in an example, in order to improve the localization accuracy so as to more accurately conduct user recognition, it is also possible to adopt plural imaging devices.

As is well known in the art, when an imaging device conducts stereo vision based localization, the localization error changes as the localization distance between the imaging device and an object to be localized changes, and the two satisfy a certain functional relationship. In general, the greater the localization distance is, the larger the localization error is. As such, when one imaging device carries out localization with respect to two nodes far away from the imaging device, since the localization error becomes larger, the imaging device may not distinguish between the two nodes. In this case, it is also possible to adopt an additional imaging device so as to improve the localization accuracy.

Thus, in the recognition method shown in FIG. 2, it is possible to adopt plural imaging devices to obtain the first distance between the user of the at least one mobile device and each imaging device. And then, regarding each imaging device, it is possible to calculate, on the basis of the corresponding first distance, a localization error range of the corresponding imaging device with respect to the user of the at least one mobile device; and to optimize, on the basis of the localization error range, the calculation result of the first positional information that the corresponding imaging device obtains. After that, it is possible to determine, on the basis of the result acquired by comparing the optimized first positional information of one of the plural imaging devices and the second positional information that the same imaging device obtains, whether or not to let the ID information of the at least one mobile device be associated with the user of the at least one mobile device.

In particular, the localization error of an imaging device may be expressed by the following equation (12).

$$\delta_A = f_{error}(d) \quad (12)$$

Here, $\delta_A$ refers to the localization error; d refers to the localization distance between the imaging device and the user of a mobile device needing to be localized; and $f_{error}$ refers to the functional relationship between the localization distance d and the localization error $\delta_A$.

In general, each imaging device has its own localization error depending on the localization distance between the corresponding imaging device and the user of a mobile device needing to be localized. Hence the localization error range of the corresponding imaging device may be expressed as a circle whose center is the position of the user and whose radius is its own localization error, and may be shown by the following equation (13).

$$C_{1a\_error} = (C_{1a}, \delta_{A1a})$$
$$C_{2a\_error} = (C_{2a}, \delta_{A2a})$$
$$\ldots$$
$$C_{na\_error} = (C_{na}, \delta_{Ana}) \quad (13)$$

Here, $C_{na}$ stands for the position of the user of a mobile device which is obtained according to stereo vision based localization by an n-th imaging device; $\delta_{Ana}$ stands for the localization error of the n-th imaging device; and $C_{na\_error}$ stands for the localization error range of the n-th imaging device.

Furthermore the position of the user of the mobile device $C_{na}$ may be expressed as three-dimensional coordinates, for example, may be expressed as the following equation (14).

$$C_{1a} = (C_{1ax}, C_{1ay}, C_{1az})$$
$$C_{2a} = (C_{2ax}, C_{2ay}, C_{2az})$$
$$\ldots$$
$$C_{na} = (C_{nax}, C_{nay}, C_{naz}) \quad (14)$$

Moreover, on the basis of the above equation (12), the localization error $\delta_{Ana}$ of each imaging device may be expressed as the following equation (15).

$$\delta_{A1a} = f_{error}(d_{1a})$$
$$\delta_{A2a} = f_{error}(d_{2a})$$
$$\ldots$$
$$\delta_{Ana} = f_{error}(d_{na}) \quad (15)$$

In addition, as described above, the localization error of each imaging device changes as the localization distance between the corresponding imaging device and the user of a mobile device changes. In other words, the smaller the localization error is, the higher the localization accuracy is. As such, it is possible to calculate the weight related to each imaging device by using the following equation (16).

$$k_{ia\_weight} = \Sigma \delta_{Aia}/\delta_{dia} \quad (16)$$

Here $k_{ia\_weight}$ denotes the weight factor with respect to the localization error range $C_{ia\_error}$ of an i-th imaging device, and $\delta_{Aia}$ denotes the localization error of the i-th imaging device.

And then, it is possible to carry out normalization with respect to the weight factor $k_{ia\_weight}$, and to utilize a triangle and centroid localization algorithm so as to narrow the localization error range, so that it is possible to improve the localization accuracy so as to obtain the optimized positional information. After that, it is possible to use the optimized positional information so as to conduct the above-described distance based comparison process.

Figure 9:
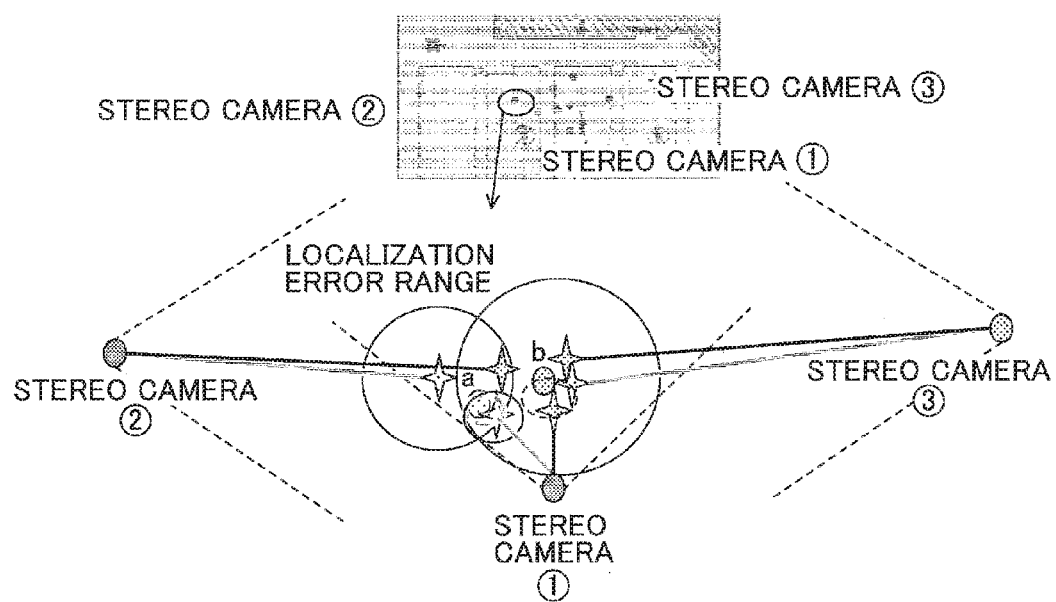
FIG. 9 illustrates how to improve localization accuracy by adopting three imaging devices.

FIG. 9 illustrates an example of how to improve the localization accuracy by adopting three imaging devices (e.g. three stereo cameras ①, ②, and ③).

As shown in FIG. 9, nodes a and b needing to be localized are located within the localization error range (which is indicated by a circle) of the stereo camera ②, so regarding the two nodes, it may be difficult to distinguish between their positional information by the stereo camera ②. However, if the three stereo cameras are adopted, then regarding the stereo camera 1, it is closer to the nodes a and b, so the relevant localization error is relatively small, and the reliability of the relevant localization result is relatively high. That is, on the basis of the localization error ranges of the three stereo cameras and their corresponding weights, it is possible to narrow the relevant localization error area so as to optimize the positional information of the nodes a and b, as shown by the shadowed area in this drawing. Thus it is possible to distinguish between the nodes a and b so as to give them corresponding ID information. Of course, adopting three imaging devices is just an example; that is, the number of imaging devices able to be adopted is not limited to this, and may be determined as needed.

Here it should be noted that in the above-described positional information optimization process, plural imaging devices are utilized. If this kind of optimization process is conducted with respect to each imaging device, then it is possible to improve the localization accuracy of the corresponding localization result. However, actually, considering the problem of algorithm cost and time consumption, it is also possible to conduct this kind of optimization process only when it is impossible to recognize, after improving the localization accuracy by utilizing the inertial data of a mobile device, the user of the mobile device. For instance, when the historical positional information of different users in the relevant valid historical window is still the same, it is possible to carry out this kind of optimization process. In addition, when conducting positional information based comparison, it is also possible to adopt the optimized positional information of only one of the plural imaging devices, or to combine the localization results of the plural imaging devices. This depends on the demand of localization and recognition accuracy.

As a result, in this way, even in a case where it is still difficult to distinguish among the historical positional information of plural users close to each other in the relevant valid historical window, it is also possible to adopt plural imaging devices to optimize the positional information of the plural users so as to distinguish among the positions of these users.

Additionally, in an example, after letting the ID information of the at least one mobile device be associated with the user of the at least one mobile device in STEP S240 of FIG. 2, the imaging device may send the first positional information of the user to the at least one mobile device, and may share the positional information of the user associated with the ID information of the at least one mobile device in the whole wireless network, so that it is also possible to carry out user tracking, etc.

As a result, by utilizing the recognition method according to this embodiment, it is possible to recognize a human being, whose position has been determined, by using two kinds of localization processes, so as to realize the recognition function with low complexity. Moreover, since this method does not need an additional video processing process, it may not receive the interference due to an external environmental factor such as lighting.

Furthermore, in this embodiment, it is also possible to more accurately recognize the user of at least one mobile device by adopting the relevant inertial data to correct the relevant positional information and/or by adopting plural imaging devices to optimize the relevant positional information. Additionally, it is also possible to share, after recognizing the user, the positional information of the user of the at least one mobile device on the basis of its ID information in the whole wireless network, so that it is possible to realize the localization demand of the whole network, and to get a localization accuracy higher than that of the conventional localization methods.

In addition, since the recognition method according to this embodiment is a positional information based identity recognition method, the imaging device may track an object, whose position has been determined, on the basis of the accurate identity information, so that particularly in a complicated environment such as a crowd, it is possible to effectively carry out a tracking process.

Figure 10:
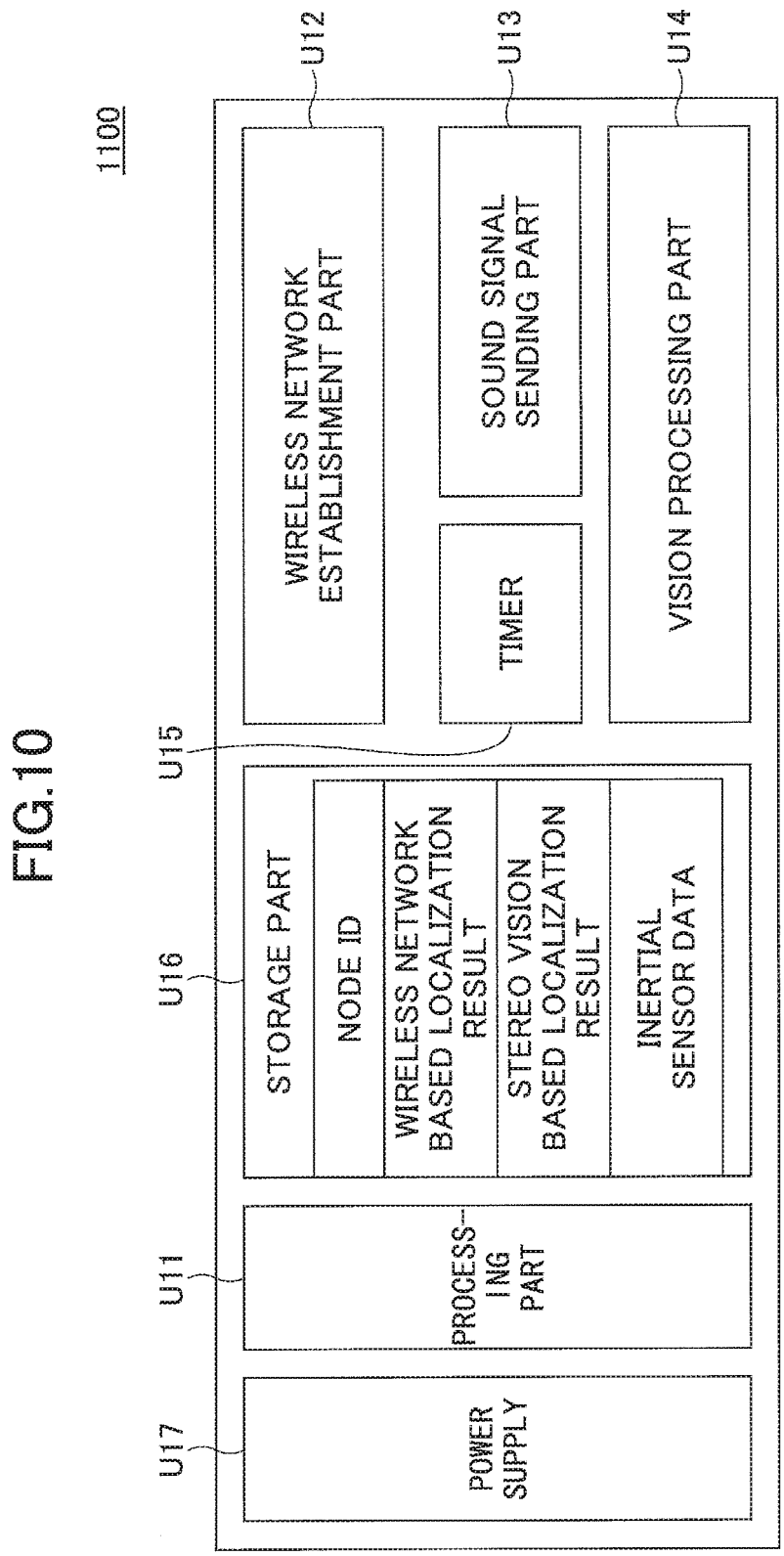
FIG. 10 is a structural block diagram of an imaging device which may be applied in the embodiments of the present invention.

FIG. 10 is a structural block diagram of an imaging device 1100 which may be applied in the embodiments of the present invention.

As shown in FIG. 10, the imaging device 1100 may include a processing part U11 for controlling the behaviors of the imaging device 1100, such as obtaining the above-described positional information and comparing the positional information; a wireless network establishment part U12 for establishing a wireless network; a sound signal sending part U13 for sending a sound signal so as to achieve wireless network based localization; a vision processing part U14 for processing images so as to realize stereo vision based localization; a timer U15 for recording the time point of sending a signal so as to achieve a TOF based distance measurement algorithm; a storage part U16 for storing the data related to the localization processes, such as the ID information, the inertial sensor data, the localization result of the wireless network based localization process, and the localization result of the stereo vision based localization process; and a power supply U17 for providing electricity.

Regarding the sound signal sending part U13, in a typical application of a mobile device, the frequency of the sound signal is within the bearable range. In another example, the frequency of the sound signal may be within the ultrasonic range (high frequencies) or the infrasound range (low frequencies).

Figure 11:
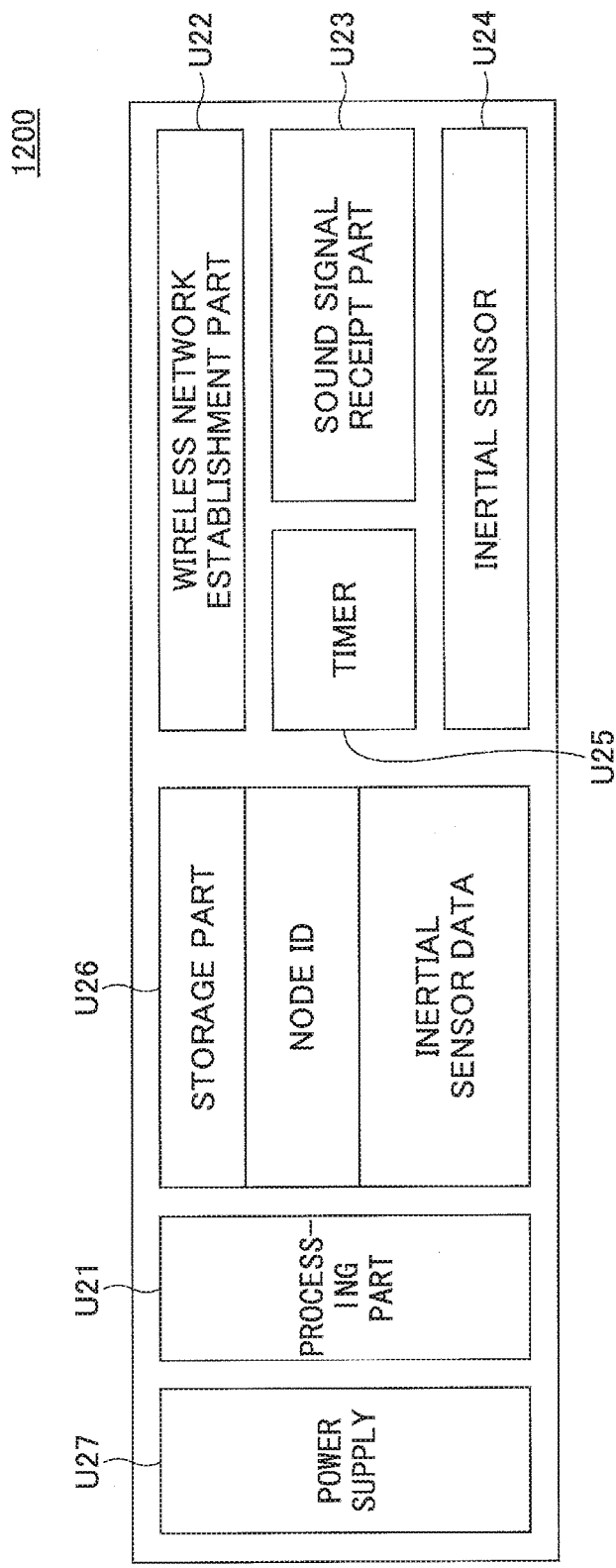
FIG. 11 is a structural block diagram of a mobile device which may be applied in the embodiments of the present invention.

FIG. 11 is a structural block diagram of a mobile device 1200 which may be applied in the embodiments of the present invention.

As shown in FIG. 11, the mobile device 1200 may include a processing part U21 configured to control the behaviors of the mobile device 1200; a wireless network establishment part U22 configured to establish a wireless network; a sound signal processing part U23 configured to receive and process a sound signal; an inertial sensor U24 configured to obtain the inertial sensor data of the mobile device 1200 so as to realize a localization process; a timer U25 configured to record the time point of receiving a signal so as to achieve a TOF based distance measurement algorithm; a storage part U26 configured to store the data related to the localization process; and a power supply U27 configured to provide electricity.

Of course, the above-described hardware structures shown in FIGS. 10 and 11 are just examples; that is, the present invention is not limited to these.

Figure 12:
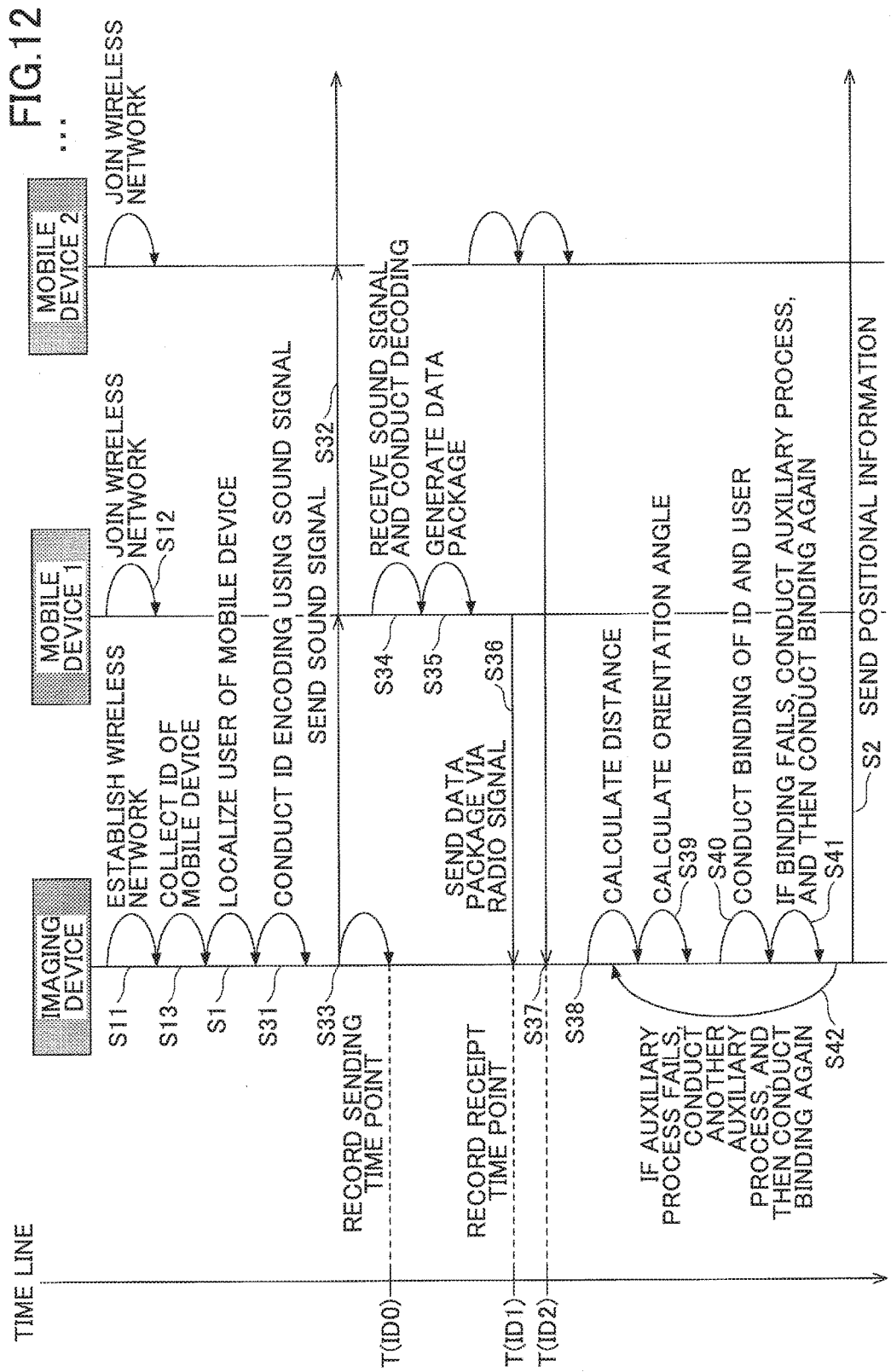
FIG. 12 illustrates a time sequence of an example of the recognition method shown in FIG. 2.

FIG. 12 illustrates a time sequence of an example of the recognition method shown in FIG. 2.

As shown in FIG. 12, the example may include the following processes, namely, (1) an imaging device establishes a wireless network at the beginning (S11); (2) a mobile device (e.g., the mobile device 1) carried by a user joins the wireless network (S12); (3) the imaging device collects the ID information of the mobile device 1 according to the relevant wireless network technique (S13); (4) the imaging device determines the user's position according to stereo vision based localization (S1); (5) the ID information of the imaging device is encoded by using a sound signal (S31); (6) the imaging device sends the sound signal to the mobile device 1 (S32); (7) after sending the sound signal, the imaging device records the sending time point (S33); (8) the mobile device 1 receives the sound signal, and then conducts decoding with respect to the sound signal so as to obtain the ID information of the imaging device (S34); (9) the mobile device 1 generates a data package including both the ID information of the imaging device and the ID information of itself (S35); (10) the mobile device 1 sends the data package via a radio signal to the imaging device (S36); (11) after receiving the radio signal, the imaging device records the receipt time point (S37); (12) the imaging device calculates a distance on the basis of Time of Flight (TOF) (S38); (13) the imaging device calculates an orientation angle on the basis of the Doppler effect and the inertial sensor data (S39); (14) by conducting distance and/or orientation angle based comparison, a binding process of the ID information of the mobile device and the user is conducted (S40); (15) if the binding process fails, a moving information based auxiliary process is conducted so as to improve the localization accuracy, and then the binding process is conducted again (S41); (16) if the moving information based auxiliary process fails, another auxiliary process based on plural imaging devices is conducted so as to improve the localization accuracy, and then the binding process is conducted again (S42); and (17) the imaging device sends the positional information of the user to the mobile device on the basis of the ID information of the mobile device so as to achieve localization in the whole network (S2).

Figure 13:
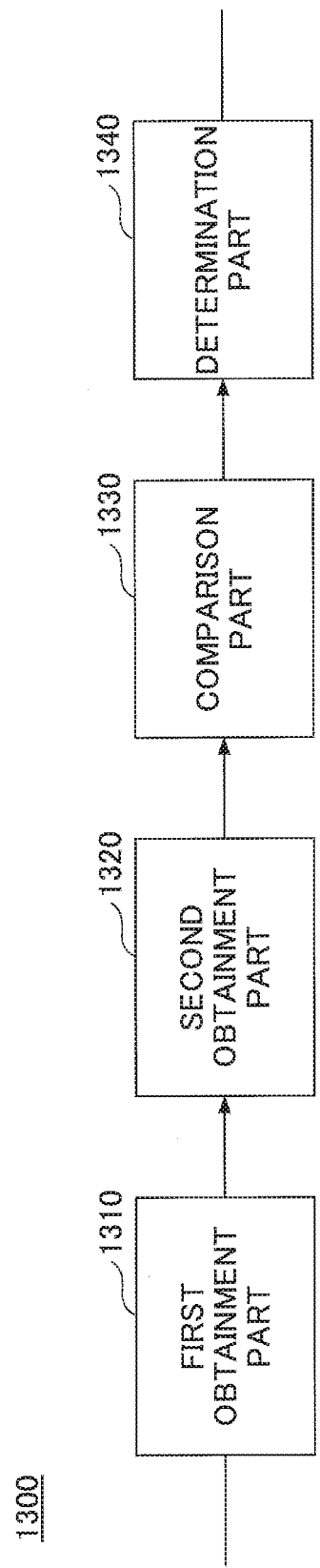
FIG. 13 is a functional block diagram of a recognition device for recognizing the user of at least one mobile device by using an imaging device, according to an embodiment of the present invention.

FIG. 13 is a functional block diagram of a recognition device 1300 for recognizing the user of at least one mobile device by using an imaging device, according to an embodiment of the present invention.

As shown in FIG. 13, the recognition device 1300 may include a first obtainment part 1310, a second obtainment part 1320, a comparison part 1330, and a determination part 1340.

The first obtainment part 1310 is configured to be able to conduct STEP S210 of the recognition method shown in FIG. 2.

The second obtainment part 1320 is configured to be able to conduct STEP S220 of the recognition method shown in FIG. 2.

The comparison part 1330 is configured to be able to conduct STEP S230 of the recognition method shown in FIG. 2.

The determination part 1340 is configured to be able to conduct STEP S240 of the recognition method shown in FIG. 2.

Here it should be noted that since STEPS S210 to S240 of the recognition method shown in FIG. 2 have been described, the repeated descriptions are omitted for the sake of convenience.

Additionally the recognition device 1300 may further include a third obtainment part (not shown in the drawings) for obtaining the inertial sensor data of the at least one mobile device, and a correction part (not shown in the drawings) for correcting the obtained first positional information of the user of the at least one mobile device on the basis of the obtained inertial sensor data.

Moreover the first obtainment part 1310 may further utilize plural imaging devices to obtain a first distance between each imaging device and the user of the at least one mobile device. In this case, the recognition device 1300 may further include a fourth obtainment part (not shown in the drawings) for obtaining the plural localization error ranges of the plural imaging devices with respect to the user of the at least one mobile device, respectively; and an optimization part (not shown in the drawings) for optimizing the calculation result of the first positional information of each of the plural imaging devices with respect to the user of the at least one mobile device on the basis of the localization error range of the corresponding imaging device.

Furthermore the recognition device 1300 may further include a sending part (not shown in the drawings) for sending, after the ID information of the at least one mobile device is associated with the user of the at least one mobile device, the first positional information of the user to the at least one mobile device.

Here it should be noted that the above respective embodiments are just exemplary ones, and the specific structure and operation of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201510064943.5 filed on Feb. 9, 2015, the entire contents of which are hereby incorporated by reference.

What is claimed is:

1. A method of recognizing a user of at least one mobile device, the method being executed by a processing system including an imaging device, the method comprising:
    obtaining, by the processing system via at least one sensor of the processing system, first positional information of the user by obtaining a first distance between the user and the imaging device, the first positional information including the first distance;
    obtaining, by the imaging device, both second positional information of the at least one mobile device and ID information of each of the at least one mobile device by obtaining a second distance between one of the at least one mobile device and the imaging device for each of the at least one mobile device, the second positional information of the at least one mobile device being relative to a position of the imaging device, the second positional information including the second distance associated with each of the at least one mobile device;
    comparing, by the processing system, the first positional information and the second positional information to obtain a comparison result by calculating a difference between the first distance and the second distance; and
    determining, by the processing system, based on the comparison result, whether to associate the ID information of the at least one mobile device with the user.

2. The method according to claim 1, wherein,
    the obtaining first positional information includes obtaining, for each of a plurality of users including the user, a first distance between one of the plurality of users and the imaging device, the first positional information including each first distance, and the comparing includes calculating differences between each first distance and each second distance; and the method further comprises:

associating one of the plurality of users corresponding to a minimum difference among the calculated differences with the ID information of one of the at least one mobile device corresponding to the minimum difference.

3. The method according to claim 2, wherein, the obtaining the first positional information includes:

acquiring disparity information of the plurality of users by the imaging device; and acquiring the first distance between the each of the plurality of users and the imaging device based on the disparity information.

4. The method according to claim 2, wherein the obtaining the second positional information includes:

authorizing each of the at least one mobile device to join a wireless network established by the imaging device;

sending, by the imaging device, a signal to each of the at least one mobile device in the wireless network; and receiving, by the imaging device, a response signal from each of the at least one mobile device including the ID information of each of the at least one mobile device, and calculating, based on both a time point of sending the response signal and a time point time of receiving the response signal, the second distance between the one of the at least one mobile device and the imaging device.

5. The method according to claim 1, wherein, the first positional information further includes a first orientation angle of the user relative to the imaging device, the second positional information further includes a second orientation angle of each of the at least one mobile device relative to the imaging device, and the determining is further based on a comparison of the first orientation angle and the second orientation angle.

6. The method according to claim 5, wherein, the comparing includes, calculating differences between the first orientation angle and each second orientation angle; and the determining includes, authorizing the association of the user with the ID information of a one of the at least one mobile device corresponding to a minimum difference among the calculated differences.

7. The method according to claim 1, further comprising:

obtaining, by the imaging device, inertial data of each of the at least one mobile device based on wireless communications between the at least one mobile device and the imaging device; and correcting the first positional information based on the inertial data before the comparing.

8. The method according to claim 1, further comprising:

obtaining, by plural imaging devices including the imaging device, the first positional information of the user;

for each of the plural imaging devices, calculating, based on the first positional information, a localization error range with respect to the at least one mobile device; and optimizing, based on the localization error range of each of the plural imaging devices, the first positional information.

9. The method according to claim 1, further comprising:

after the ID information of the at least one mobile device is associated with the user, the first positional information of the user to the at least one mobile device.

10. A device for recognizing a user of at least one mobile device by using an imaging device, comprising:

a memory configured to store computer readable instructions; and a processor configured to execute the computer readable instructions to obtain first positional information of the user by using the imaging device by obtaining a first distance between the user and the imaging device, the first positional information including the first distance, obtain both second positional information and ID information of the at least one mobile device by obtaining a second distance between one of the at least one mobile device and the imaging device for each of the at least one mobile device, the second positional information being relative to a position of the imaging device, the second positional information including the second distance associated with each of the at least one mobile device, compare the first positional information and the second positional information so as to obtain a comparison result by calculating a difference between the first distance and the second distance, and determine, based on the comparison result, whether to associate the ID information of the at least one mobile device with the user.

11. A non-transitory machine-readable medium having machine-executable instructions for execution by a processing system, wherein, the machine-executable instructions, when executed, cause the processing system to carry out the method according to claim 1.

* * * * *